(12) United States Patent
Takeuchi et al.

(10) Patent No.: US 7,913,737 B2
(45) Date of Patent: Mar. 29, 2011

(54) BONDING APPARATUS AND BONDING METHOD

(75) Inventors: Hachiya Takeuchi, Yokohama (JP); Shohei Tanabe, Yokohama (JP); Hisashi Nishigaki, Yokohama (JP)

(73) Assignee: Shibaura Mechatronics Corporation, Kanagawa (JP)

( * ) Notice: Subject to any disclaimer, the term of this patent is extended or adjusted under 35 U.S.C. 154(b) by 690 days.

(21) Appl. No.: 10/581,851

(22) PCT Filed: Dec. 3, 2004

(86) PCT No.: PCT/JP2004/018050
§ 371 (c)(1),
(2), (4) Date: Feb. 22, 2007

(87) PCT Pub. No.: WO2005/055223
PCT Pub. Date: Jun. 16, 2005

(65) Prior Publication Data
US 2007/0272351 A1  Nov. 29, 2007

(30) Foreign Application Priority Data

Dec. 5, 2003  (JP) .................................. 2003-406827

(51) Int. Cl.
*B29C 65/00* (2006.01)
*B29C 65/02* (2006.01)
*B32B 37/00* (2006.01)
*B32B 38/04* (2006.01)
*B27G 11/02* (2006.01)
*B31F 5/04* (2006.01)

(52) U.S. Cl. ..................... 156/556; 156/275.5; 156/286; 156/379.8

(58) Field of Classification Search .................... 156/60, 156/74, 99, 196, 219, 220, 242, 245, 272.2, 156/273.7, 275.5, 275.7, 285, 286, 307.1, 156/379.6, 379.8, 381, 382, 538, 539, 556, 156/557, 558, 559, 563, 564, 565, 571; 414/217, 414/222.01, 222.08, 222.09, 222.12, 222.13, 414/226.03; 269/57
See application file for complete search history.

(56) References Cited

U.S. PATENT DOCUMENTS
6,312,549 B1 * 11/2001 Miyano et al. ................. 156/286
(Continued)

FOREIGN PATENT DOCUMENTS
CN  1226989 A  8/1999
(Continued)

OTHER PUBLICATIONS

English translation of Kotoyori, Masahiko (JP 2002-074759): Method and Device for Laminating Optical Disk; Mar. 15, 2002.*

(Continued)

*Primary Examiner* — Philip C Tucker
*Assistant Examiner* — Brian R Slawski

(57) ABSTRACT

The present invention provides a bonding apparatus and bonding method which can prevent warping of substrates by ensuring a sufficient standing time following bonding of the substrates, using a simple and compact apparatus. Substrate carrying parts 1*a* are formed along the circumference of a rotating turntable 1. The respective substrate carrying parts 1*a* are formed so that these parts pass through substrate placement positions 11 and 12, a bonding position 13, pre-curing standing positions 14*a* through 14*d*, a curing position 15, a post-curing standing position 16 and a conveying position 17 as the turntable 1 rotates. After being bonded in the bonding position 13, the substrates move through the pre-curing standing positions 14*a* through 14*d* as a result of the rotation of the turntable 1, and are allowed to stand for a fixed period of time, so that warping is corrected.

20 Claims, 10 Drawing Sheets

U.S. PATENT DOCUMENTS

| | | | |
|---|---|---|---|
| 2002/0108715 A1* | 8/2002 | Higaki et al. | 156/379.6 |
| 2003/0104097 A1* | 6/2003 | Matsumoto et al. | 425/500 |

FOREIGN PATENT DOCUMENTS

| | | | |
|---|---|---|---|
| JP | 10-255340 | | 9/1998 |
| JP | 10289491 A | * | 10/1998 |
| JP | 2000-348389 | | 12/2000 |
| JP | 2001-014736 | | 1/2001 |
| JP | 2002-074759 | | 3/2002 |
| JP | 2002-092969 | | 3/2002 |
| JP | 2002-251803 | | 9/2002 |
| JP | 2003-048220 | | 2/2003 |
| JP | 2003-099985 | | 4/2003 |
| JP | 2003-346389 | | 12/2003 |
| WO | 98/54708 | | 3/1998 |

OTHER PUBLICATIONS

English translation of Hosogai, Nobukazu (JP 10-289491): DVD Bonding Apparatus; Oct. 27, 1998.*

* cited by examiner

BONDING APPARATUS AND BONDING METHOD

TECHNICAL FIELD

The present invention relates to a bonding apparatus and bonding method for bonding substrates to each other for the purpose of manufacturing, for example, flat-plate-form recording media such as optical disks.

BACKGROUND ART

In the case of optically readable circular disk form recording media such as optical disks, optical-magnetic disks and the like, not only media for playback use only, but also media that allow the rewriting of recorded information, have become widely popular. Such recording media are manufactured by bonding substrates to each other in order to protect the recording surfaces formed on the substrates, or in order to realize high-density recording by the multi-layer formation of recording surfaces.

For example, the manufacture of such recording media is accomplished by the procedure shown in FIG. 12. Specifically, two substrates made of a polycarbonate are injection-molded (1001), and a metal film is formed on these substrates by sputtering in a sputtering chamber (1002). Then, the joining surfaces of the two substrates are coated by spin coating with an ultraviolet curable adhesive agent (1003). The pair of substrates thus coated with an adhesive agent is inserted into a vacuum chamber, and the adhesive-agent surfaces are bonded to each other in a vacuum (1004). The substrates thus bonded together are removed from the vacuum chamber and exposed to atmospheric pressure, and the adhesive agent is cured by irradiation with ultraviolet light (1005). As a result, the two substrates are firmly bonded together, and the disk is completed. In particular, a technique such as that disclosed in Patent Reference 1 has been proposed in the past as a disk manufacturing apparatus commonly using a rotating turntable to convey the substrates.

If warping (tilting) occurs in a disk manufactured as described above, there is a possibility that the laser light used to read and write information will not accurately reach the specified position on the recording surface when the disk is irradiated with this laser light. Accordingly, in such optical disks, the exclusion of such warping is important for ensuring stable quality of the product.

In order to deal with this problem, a technique in which so-called annealing that eliminates or relaxes residual stress in the material by heat-treating the substrates before or after bonding has been proposed as described in Patent Reference 2 and Patent Reference 3.

Patent Reference 1: Japanese Patent Application Laid-Open No. 2000-348389
Patent Reference 2: Japanese Patent Application Laid-Open No. 2001-14736
Patent Reference 3: Japanese Patent Application Laid-Open No. 2002-92969
Patent Reference 4: Japanese Patent Application Laid-Open No. 10-255340

DISCLOSURE OF THE INVENTION

However, annealing by means of a heat treatment requires an apparatus for heating, and control of the heating temperature is difficult. It is also conceivable that the generation of warping might be suppressed to a certain extent by utilizing the time for which the substrates are allowed to stand until the adhesive is cured following bonding. However, in cases where such a standing time is to be ensured in a rectilinear conveying path such as that described in Patent Reference 2, a long conveying path is required, and the size of the apparatus is increased.

On the other hand, in cases where substrates are conveyed by means of a turntable, for example, the first and second substrates are placed as shown in FIG. 13 (positions A and B), the substrates are bonded together in a bonding part (position C), curing by means of ultraviolet radiation is then immediately performed in a curing part (position D), and the wafers are subsequently conveyed to the next process (position E). Accordingly, standing time for the correction of warping can be guaranteed.

The present invention was devised in order to solve the conventional problems described above; it is an object of the present invention to provide a bonding apparatus and bonding method which can ensure a sufficient standing time following substrate bonding by means of a simple and compact apparatus, so that warping can be prevented.

In order to achieve such an object, the present invention is characterized by the fact that in a bonding apparatus which has a bonding part that bonds a plurality of substrates coated with an adhesive agent, and a curing part that cures the adhesive agent of the bonded substrates, this apparatus further comprises conveying means for conveying the substrates from the abovementioned bonding part to the abovementioned curing part, and the abovementioned conveying means has a standing part which allows the bonded substrates to stand at room temperature in the atmosphere.

In a preferred embodiment, a bonding method in which a plurality of substrates are coated with an adhesive agent, these substrates are bonded together, and the adhesive agent is cured is characterized in that the abovementioned substrates are allowed to stand at room temperature in the atmosphere at an intermediate point in the conveying process from the bonding position for the substrates to the curing position for the adhesive agent.

In the above invention, since the bonded substrates are allowed to stand at room temperature in the atmosphere prior to the curing of the adhesive agent, the occurrence of warping can be prevented without any particular use of a heating means.

In a preferred embodiment, the apparatus is characterized in that the abovementioned conveying means is a turntable that rotates while carrying a plurality of substrates.

Furthermore, a preferred embodiment of the present invention is characterized in that the abovementioned conveyance is accomplished by means of a turntable.

In such an invention, the required expansion of space by extension of the conveying path that is needed in order to ensure the necessary standing time can be reduced by using a turntable that conveys the substrates in a circumferential pattern.

A preferred embodiment is characterized in that a plurality of the abovementioned turntables are used.

In such an invention, as a result of the use of a plurality of turntables, a sufficient standing part can be ensured even if small-diameter turntables are used.

A preferred embodiment is characterized in that the abovementioned plurality of turntables include concentric small-diameter and large-diameter tables.

In such an invention, since the plurality of turntables are concentric, the required space can be reduced compared to a case in which the plurality of turntables are installed side by side.

A preferred embodiment is characterized in that the abovementioned plurality of turntables include a large-diameter table, and a plurality of small-diameter tables which are disposed on the abovementioned large-diameter table so that the small-diameter tables can rotate about different axes.

In such an invention, since a standing part can be ensured by a plurality of small-diameter tables on the large-diameter table, the standing time can be lengthened while ensuring a saving in space.

A preferred embodiment is characterized in that the abovementioned conveying means is an endless or curvilinear conveyor.

Furthermore, a preferred embodiment is characterized in that the abovementioned conveyance is accomplished by means of an endless or curvilinear conveyor.

In such inventions, the required space can be contracted, and the degree of freedom in the layout can be increased, by ensuring a standing part in a conveyor that is not rectilinear.

In a preferred embodiment, the apparatus is characterized in that the abovementioned conveying means has an accommodating part which stacks and accommodates a plurality of substrates that are conveyed from the abovementioned bonding part while conveying these substrates to the abovementioned curing part.

In such an invention, a sufficient standing time can be ensured while realizing a saving in space by temporarily stacking and accommodating the substrates following bonding.

A preferred embodiment is characterized in that the conveying time in the abovementioned standing part is set to be a time that is at least equal to the time required in order to correct warping of the substrates following bonding.

A preferred embodiment is characterized in that the time required for the abovementioned standing includes at least the time required in order to correct warping of the substrates following bonding.

In such inventions, since at least time for the correction of the warping of the bonded substrates is ensured, a product that is free of warping can be reliably manufactured.

A preferred embodiment is characterized in that the abovementioned conveying means is formed so that a free standing period of no operation of shifting the substrates in an interval extending from the abovementioned bonding part to the abovementioned curing part.

Furthermore, a preferred embodiment is characterized in that the abovementioned substrates are conveyed without any shifting operation in the interval extending from the bonding position of the substrates to the curing position of the adhesive agent.

In such inventions, substrates that have settled into a stable state during standing are not placed in an unstable state by a shifting operation, so that tilting can be suppressed.

Thus, as was described above, the present invention makes it possible to provide a bonding apparatus and bonding method which make it possible to ensure a sufficient standing time following the bonding of the substrates, and to prevent warping, by means of a simple and compact apparatus.

Figure 1:
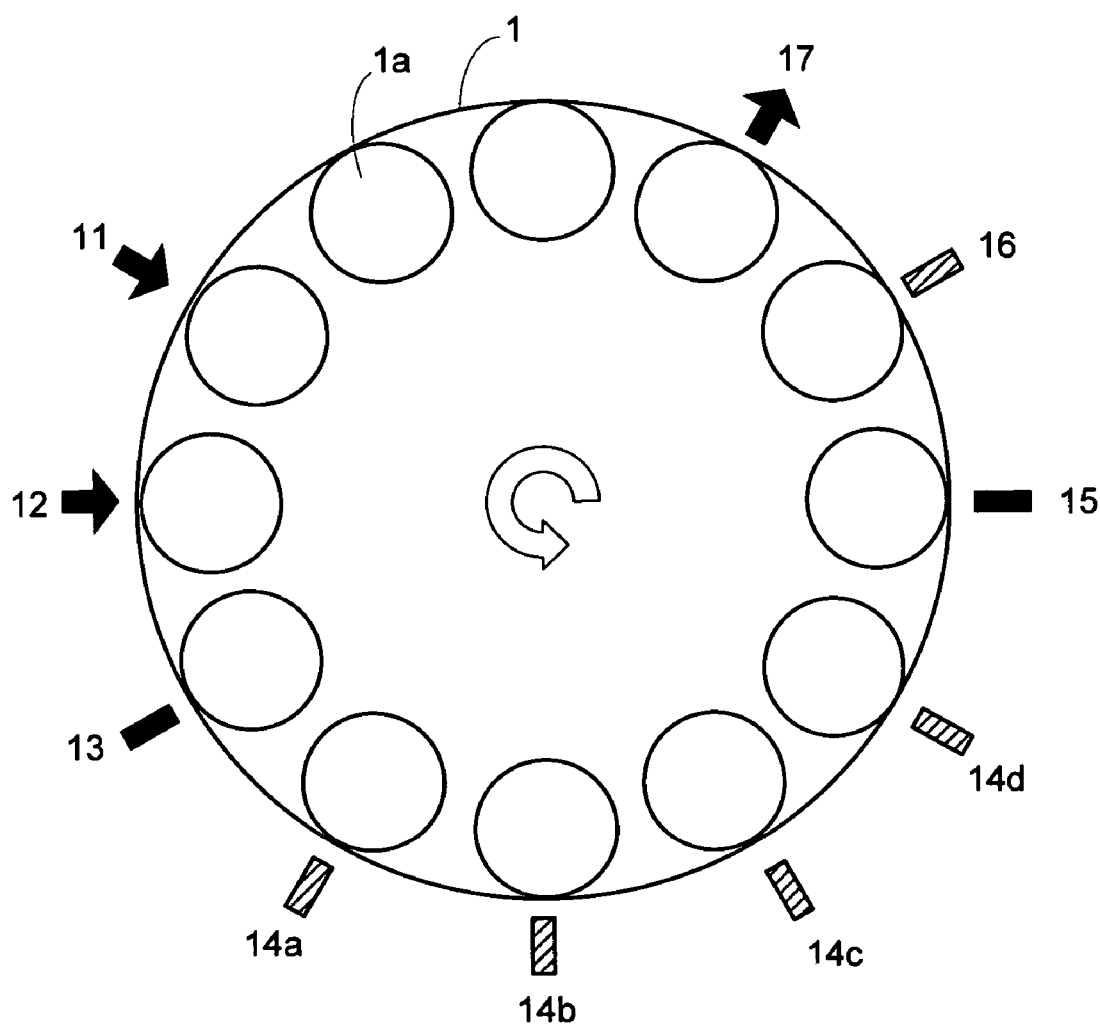
FIG. 1 is a schematic plan view showing a first embodiment of the present invention.

EXPLANATION OF SYMBOLS 1 to 9 Turntables
1a through 9a, 100a Substrate carrying parts
11, 12, 21, 22, 41, 42, 111, 112, A, B Substrate placement positions
13, 23, 43, 113, C Bonding positions
14a through 14d, 32a through 32d, 52a through 52c, 114a through 114d Pre-curing standing positions
15, 33, 45, 115, D Curing positions
16, 46, 116 Post-curing standing positions
17, 25, 47, 117 Conveying positions
24, 31, 44, 51 Transfer positions
100 Conveyor
200 Susceptor
210 Accommodating part Best Mode For Carrying Out The Invention Next, preferred embodiments for carrying out the present invention (hereafter referred to as embodiments) will be concretely described with reference to the attached figures.

First Embodiment

[Construction]

First, a first embodiment of the present invention will be described. Specifically, as is shown in FIG. 1, the present embodiment uses a 12-position turntable 1 as a conveying means for conveying substrates from the bonding part to the curing part. This turntable 1 rotates while carrying substrates or susceptors that carry substrates. 12 substrate carrying parts 1a are constructed along the circumference of this turntable. The respective substrate carrying parts 1a are constructed so that these parts pass through substrate placement positions 11 and 12, a bonding position 13, pre-curing standing positions 14a through 14d, a curing position 15, a post-curing standing position 16 and a conveying position 17 as the turntable 1 rotates.

The substrate placement positions 11 and 12 are positions into which a pair of substrates coated with an ultraviolet curable adhesive agent are conveyed so that the adhesive agent surfaces face each other. A bonding part not shown in the figures is constructed in the bonding position 13. This bonding part is constructed inside a vacuum vessel in which an appropriate degree of vacuum can be applied in accordance with the conveying in and conveying out of substrates, and is a device in which the pair of substrates conveyed in are bonded to each other; any universally known technique may be used.

The pre-curing standing positions 14a through 14d are positions in which the substrates following bonding are allowed to stand at room temperature in the atmosphere while being conveyed. As a result, the free standing part described in the claims is constructed. Furthermore, the means for setting a rotational speed of the turntable 1 is set so that the correction of warping (described later in FIGS. 2 and 3) is performed while the bonded substrates move through the pre-curing standing positions 14a through 14d. A curing part not shown in the figures is constructed in the curing position 15. This curing part is a means which cures the adhesive agent by irradiating the bonded substrates with ultraviolet light; any universally known technique may be used. The post-curing standing position 16 is a position in which the substrates following curing of the adhesive agent are allowed to stand at room temperature in the atmosphere while being conveyed. The conveying position 17 is a position where the bonded substrates are conveyed out to the next process.

[Operation]

The operation of the present embodiment constructed as described above will be described next. Specifically, one substrate coated with an ultraviolet curable adhesive agent is placed in the substrate carrying part 1a that has arrived in the substrate placement position 11 as a result of the rotation of the turntable 1. As the turntable 1 rotates, this substrate carrying part 1a moves to the substrate placement position 12, and another substrate coated with the adhesive agent is placed so that the bonding surface of this substrate faces the first substrate.

As the turntable 1 rotates, the pair of facing substrates are conveyed into the bonding part of the bonding position 13, whereupon a vacuum is applied to the vacuum vessel, and the substrates are bonded to each other. The substrates following bonding are conveyed out from the vacuum vessel into the atmosphere at room temperature by the rotation of the turntable 1, and move through the pre-curing standing positions 14a through 14d, so that these substrates are allowed to stand for a fixed time, thus correcting the warping. When the substrates thus move through the bonding position 13, pre-curing standing positions 14a through 14d, curing position 15, post-curing standing position 16 and conveying position 17, since the substrates or susceptors carrying substrates are carried on the turntable 1, no work such as shifting by other devices or the like is performed. In other words, at least from the bonding part to the standing parts and curing part, the substrates or susceptors carrying substrates are conveyed without any contact with devices other than the conveying means and are free standing on the turntable.

The reason that warping is corrected when the substrates are allowed to stand for a fixed time following bonding is as follows: namely, warping ordinarily occurs in the two substrates prior to bonding. If these two substrates are forcibly bonded as parallel flat plates, the bonding is finished in a state in which there is internal stress. If these substrates are allowed to stand, the two substrates move until a state is reached in which there is no stress. Accordingly, in regard to the warping of the single substrates prior to bonding, the substrates are prepared under conditions in which there is little warping when the substrates are bonded in a state in which there is no internal stress. Consequently, the warping is diminished when the substrates are allowed to stand.

Figure 2:
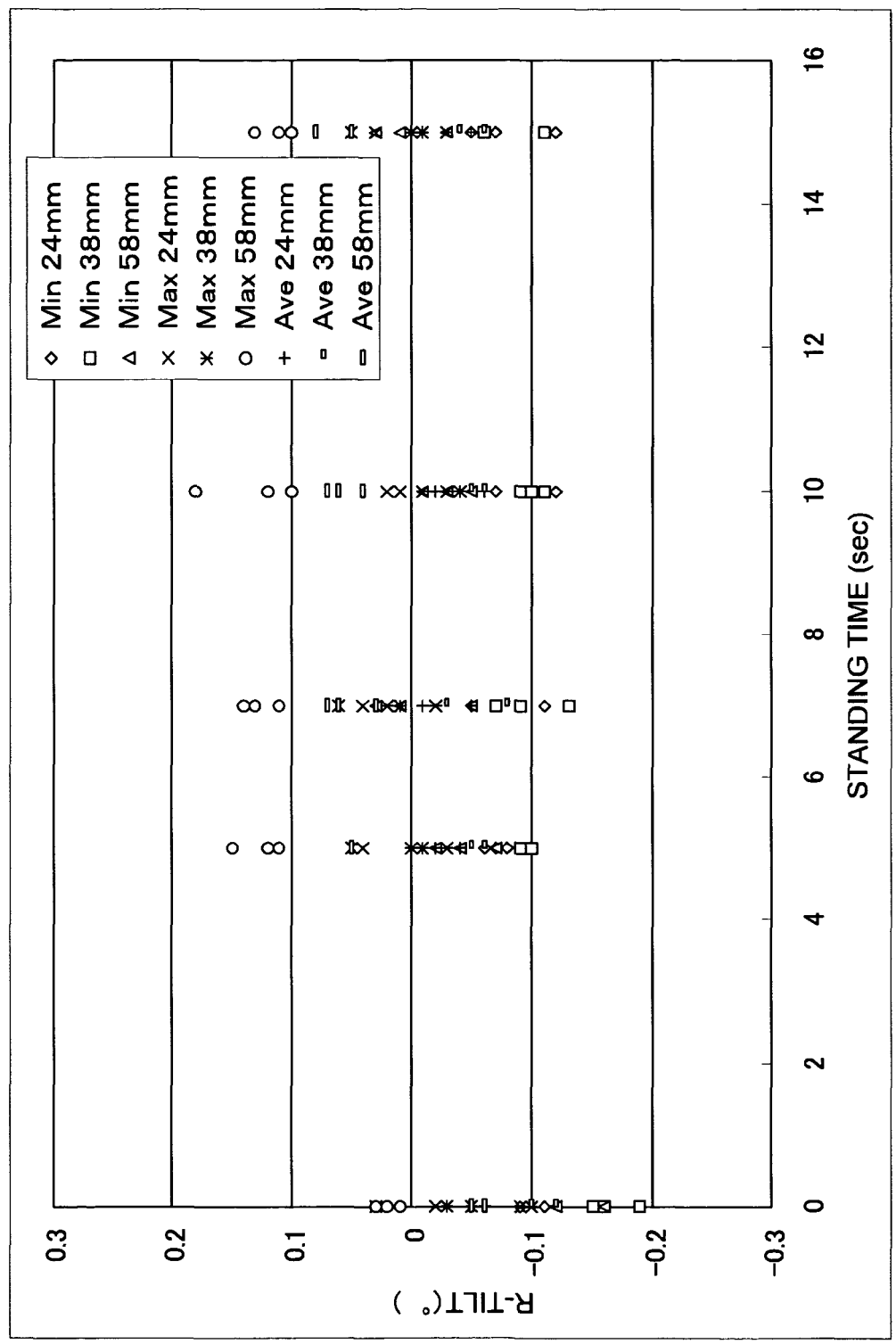
FIG. 2 is an explanatory diagram showing the relationship between standing time following bonding in a vacuum and warping in the radial direction.
Figure 3:
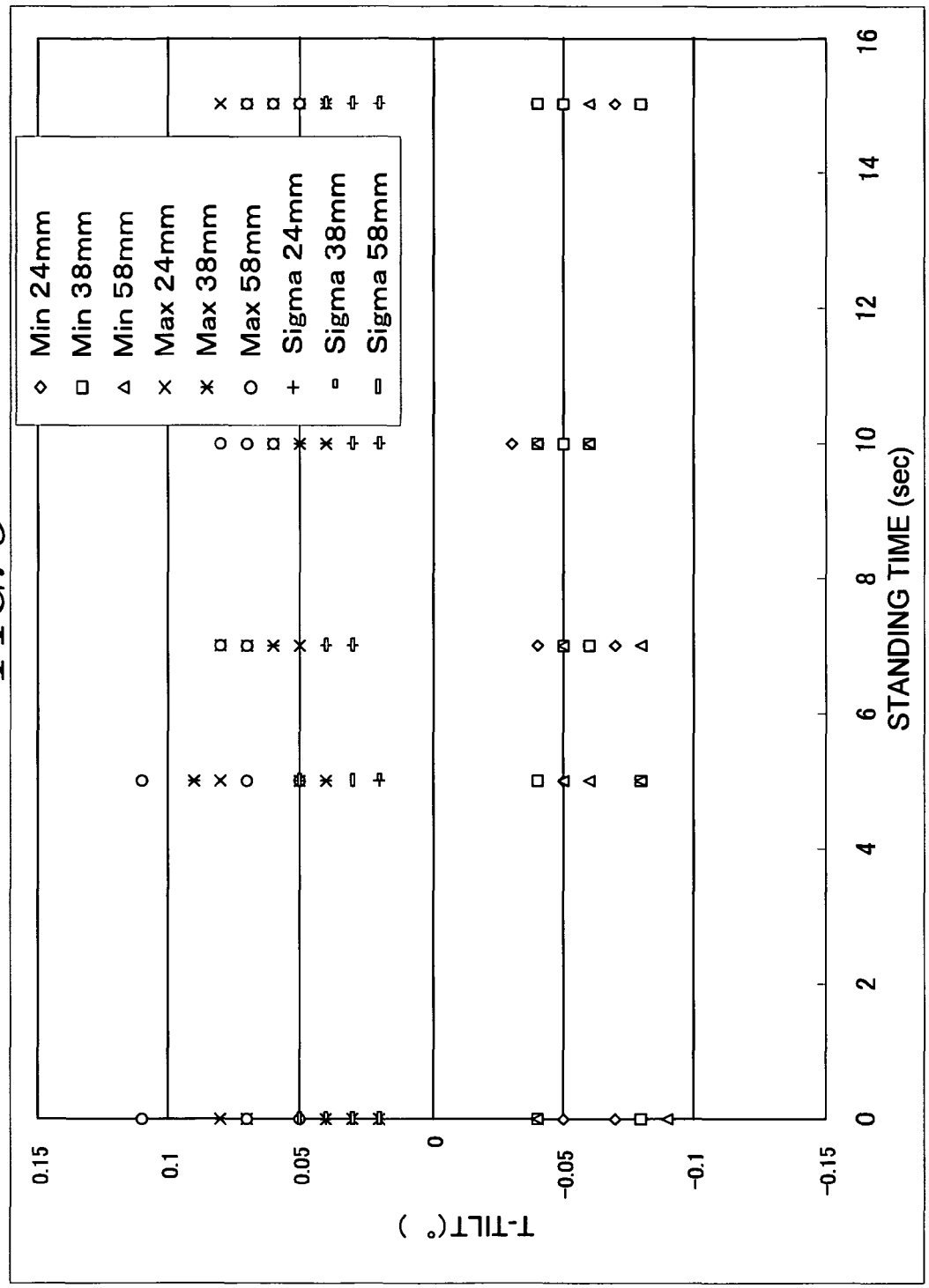
FIG. 3 is an explanatory diagram showing the relationship between standing time following bonding in a vacuum and warping in the tangential direction.

Concrete examples of the standing time required for such correction of the warping are shown in FIGS. 2 and 3. FIGS. 2 and 3 show an example in which a DVD-9 (8.5 GB ROM two-layer disk) is prepared by bonding together substrates using an ultraviolet curable adhesive agent. The exhaust time is set at 2.3 seconds. Furthermore, FIG. 2 shows the relationship between the standing time and the warping in the radial direction (R-tilt), and FIG. 3 shows the relationship between the standing time and the warping in the tangential direction (T-tilt). It is seen from this example that warping in the radial direction is stabilized if a standing time of 5 seconds or longer is ensured, and that warping in the tangential direction is stabilized if a standing time of 7 seconds or longer is ensured. Accordingly, all warping can be stabilized at a standing time of at least about 7 seconds. However, these numerical values fluctuate according to various concrete conditions such as the material of the substrates used, the type of adhesive agent used and the like; accordingly, the present invention is not limited to these numerical values.

Furthermore, the substrates following standing are conveyed into the curing position 15 by the rotation of the turntable 1, and the adhesive agent is cured by irradiation with ultraviolet light. Moreover, the substrates in which the adhesive agent has been cured are conveyed out from the curing part by the rotation of the turntable 1, and are allowed to stand for a fixed time in the post-curing standing position 16, so that the warping by the heat of the ultraviolet radiation following curing is corrected. Then, the substrates reach the conveying position 17, and are conveyed out to the next process. Thus, deformation caused by the heat of the ultraviolet radiation (approximately 70 degrees or less) is also returned to the original shape as a result of the substrates being allowed to stand.

[Effects]

In the present embodiment described above, long pre-curing standing positions 14a through 14d are ensured by using a 12-position turntable. Accordingly, after the substrates are bonded together, curing of the adhesive agent can be accomplished by ultraviolet irradiation after leaving a sufficient standing time. Accordingly, the occurrence of warping can be prevented without using any particular heating means. Furthermore, an expansion of the required space caused by the lengthening of the conveying path in order to ensure a sufficient standing time can be prevented by using a turntable 1 that conveys the substrates in a circular configuration. Moreover, conveying is performed in a state in which substrates or susceptors carrying these substrates are carried on the turntable 1, so that no shifting operation of the substrates is performed when the substrates move through the bonding position 13, pre-curing standing positions 14a through 14d, curing position 15, post-curing standing position 16, and conveying position 17. Accordingly, substrates that have settled into a stable state are not placed in an unstable state by any shifting operation, so that tilting can be suppressed. The same is true in cases where transfer operations are included between turntables as in the embodiment described below. In other words, by transferring the substrates along with susceptors carrying these substrates, the substrates can be conveyed without any shifting operation.

Figure 4:
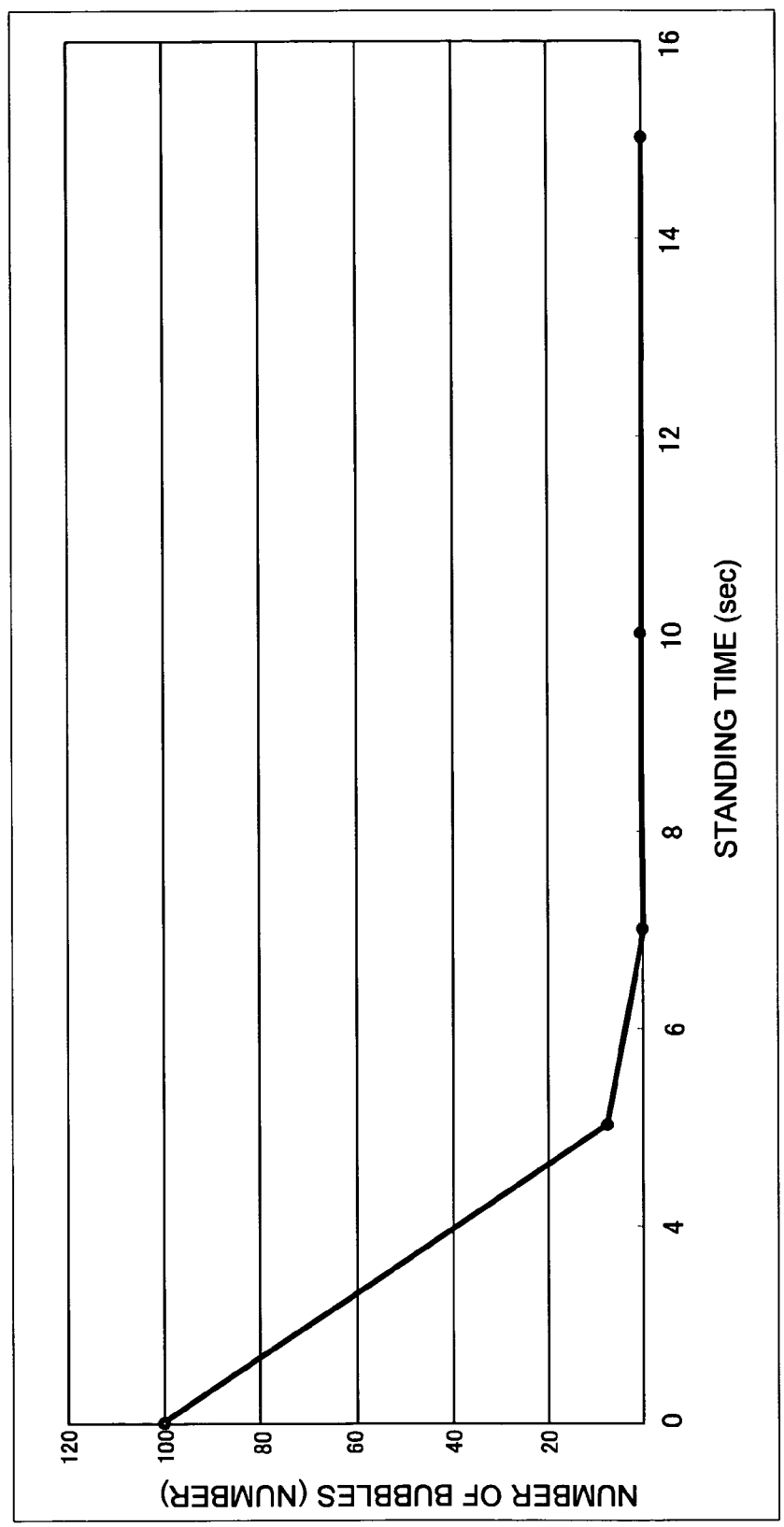
FIG. 4 is an explanatory diagram showing one example of the relationship between standing time following bonding in a vacuum and number of bubbles.

Furthermore, if gas bubbles remain in the adhesive agent layer after the disks are bonded, a defective external appearance, defective bonding, defective reading and the like may occur, or air in the gas bubbles may contact the films, resulting in an acceleration of changes over time. However, in the present embodiment, a sufficient standing time can be ensured following bonding, so that the number of such gas bubbles can be conspicuously reduced. For example, FIG. 4 shows the relationship between standing time following vacuum bonding and the number of bubbles generated in a case where a DVD-9 was manufactured in the same manner as described above using SD-698 manufactured by Dai-Nippon Inki Kagak Kogyo K.K. as the adhesive agent. The bubble size used as a standard for counting was 5 μm or greater. According to this example, gas bubbles can be eliminated at a standing time of 7 seconds. However, these numerical values also fluctuate depending on various concrete conditions such as the material of the substrates used, type of adhesive agent used and the like.

Figure 5:
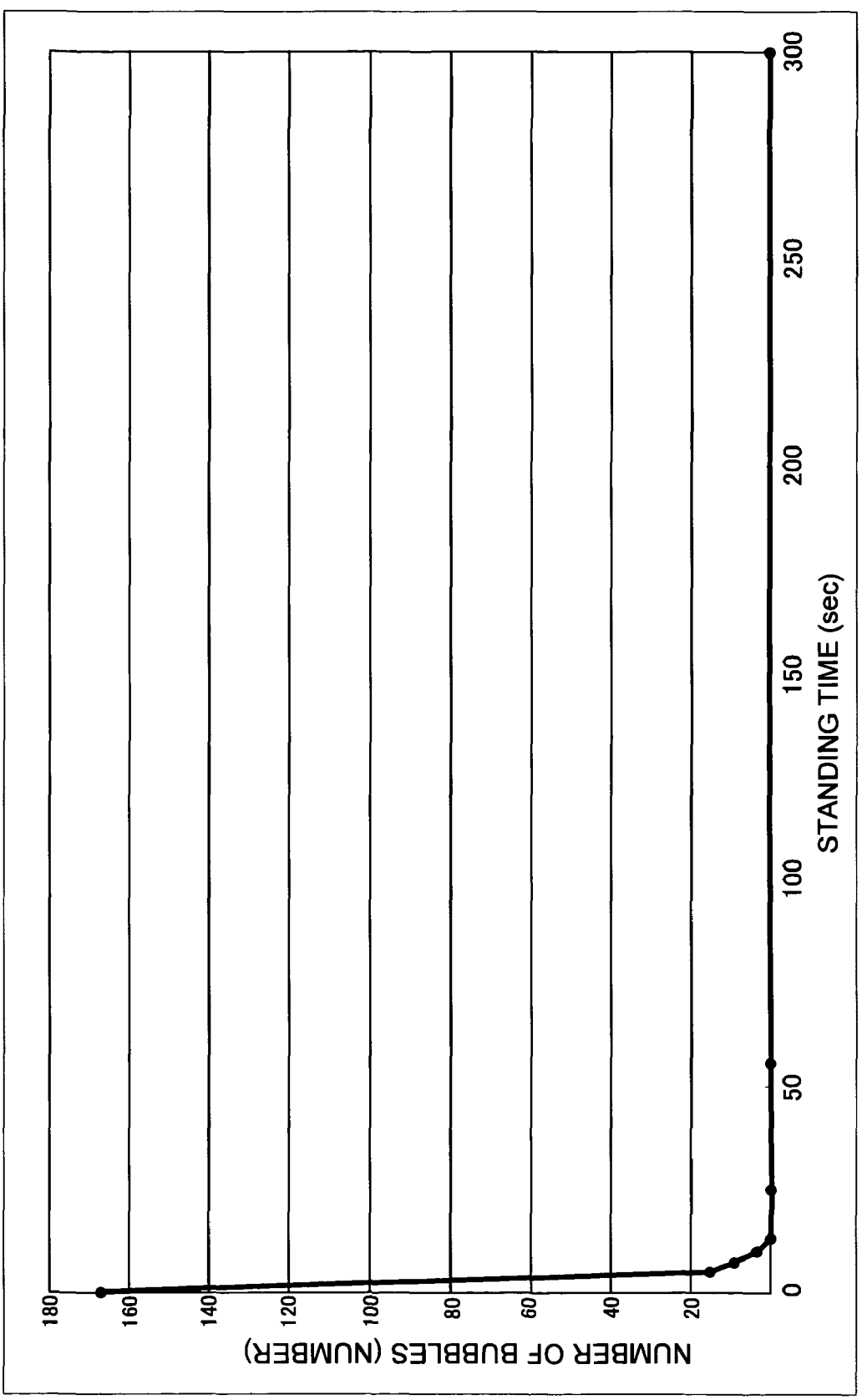
FIG. 5 is an explanatory diagram showing another example of the relationship between standing time following bonding in a vacuum and number of bubbles.
Figure 6:
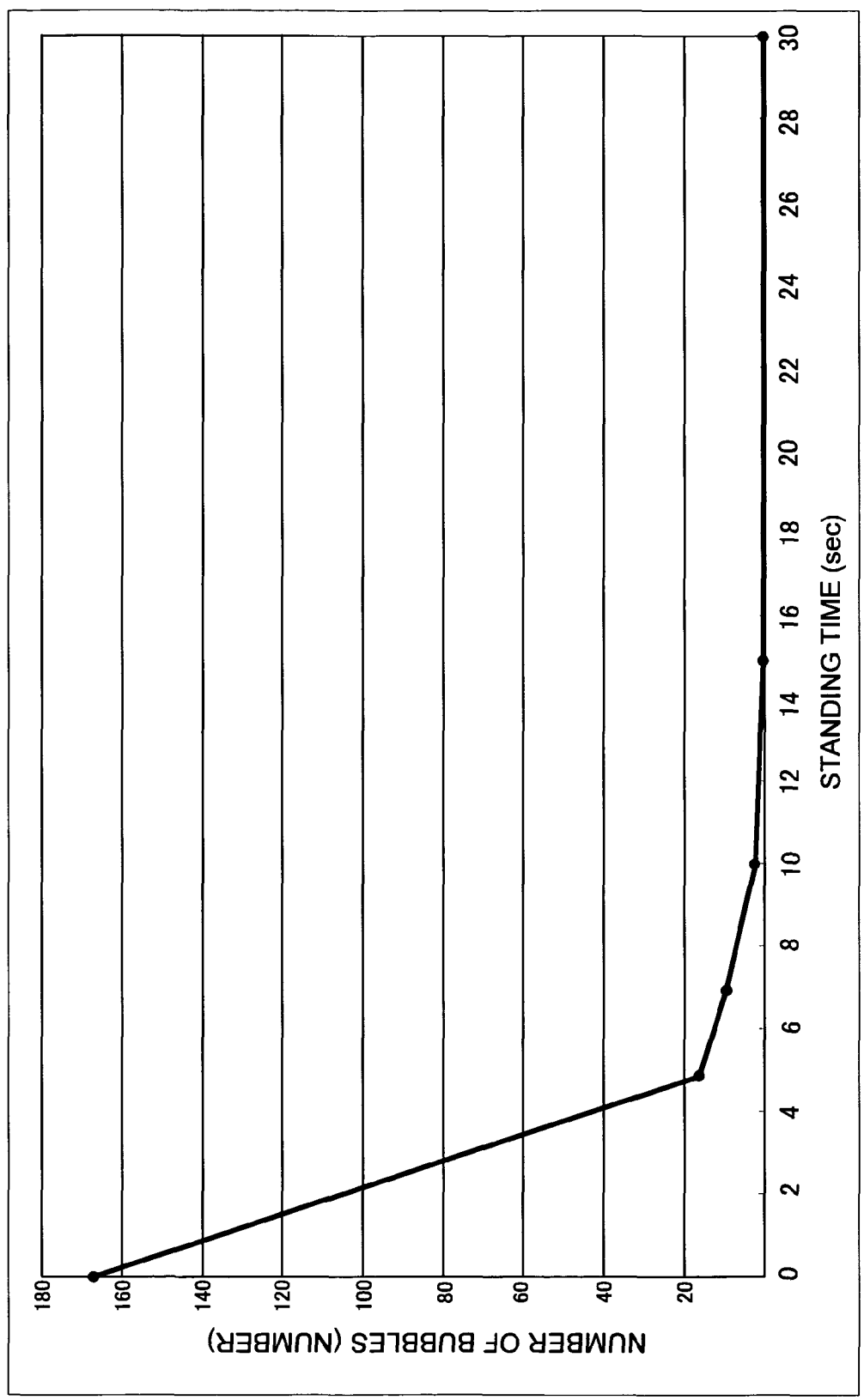
FIG. 6 is an explanatory diagram showing the portion of the standing time between 0 and 30 seconds in FIG. 5.

As another example, FIGS. 5 and 6 show a case where a DVD-9 was manufactured using DVD-576M manufactured by Nippon Kayaku K.K. The other conditions were the same as in FIG. 4. According to this example, the number of bubbles reaches the permissible level of 3 at a standing time of 10 seconds, and bubbles are eliminated at a standing time of 15 seconds. Thus, in the present embodiment, a standing time which is such that the number of bubbles is reduced almost to zero can easily be ensured. Accordingly, the generation of defective products and changes in the products over time can be prevented. Furthermore, since such an effect in suppressing the number of gas bubbles can be obtained by ensuring a sufficient standing time, similar results can be expected in the following embodiments as well.

Second Embodiment

[Construction]

Figure 7:
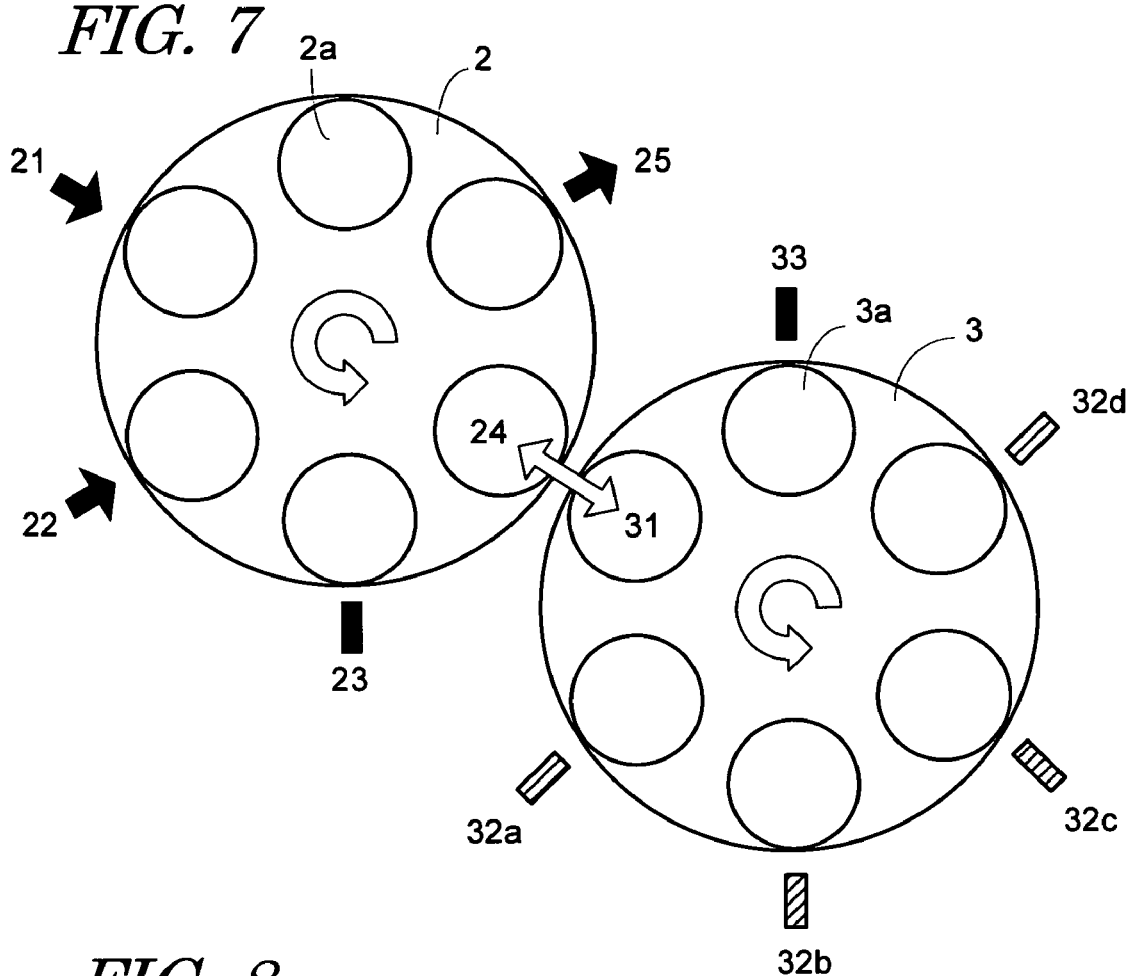
FIG. 7 is a schematic plan view showing a second embodiment of the present invention.

A second embodiment of the present invention will be described next. Specifically, as shown in FIG. 7, the present embodiment is an embodiment which uses two adjacent turntables 2 and 3 as a conveying means for conveying the substrates from the bonding part to the curing part. These turntables 2 and 3 are 6-position tables which respectively carry substrates or susceptors carrying substrates, and which rotate in the same direction. Six substrate carrying parts 2a and 3a are constructed on these tables along the circumferential direction.

The substrate carrying parts 2a in the turntable 2 are constructed so that these parts move through substrate placement positions 21 and 22, a bonding position 23, a transfer position 24 and a conveying position 25 as the turntable 2 rotates. The substrate carrying parts 3a in the turntable 3 are constructed so that these parts move through a transfer position 31, pre-curing standing positions 32a through 32d, and a curing position 33, as the turn table 3 rotates.

The substrate placement positions 21 and 22, bonding position 23 and conveying position 25 in the turntable 2, and the pre-curing standing positions 32a through 32d and curing position 33 in the turntable 3 are similar to those in the abovementioned first embodiment. The transfer position 24 in the turntable 2 and the transfer position 31 in the turntable 3 are positions where substrates or susceptors carrying substrates are transferred between the turntable 2 and turntable 3. Any universally known technique used for the exchange of substrates between turntables may be used as the mechanism that is used for transfer in this embodiment.

[Operation]

Next, the operation of the present embodiment constructed as described above will be described. Specifically, a pair of substrates coated with an adhesive agent are successively placed in the substrate carrying parts 2a that have arrived in the substrate placement position 21 and substrate placement position 22 as a result of the rotation of the turntable 2, and are bonded together in the bonding part in the bonding position 23. The bonded substrates or a susceptor carrying the substrates are conveyed out from the vacuum chamber into the atmosphere at room temperature by the rotation of the turntable 2, and move to the transfer position 24. These substrates are then transferred to the substrate carrying part 3a that has arrived at the transfer position 31 of the turntable 3.

The bonded substrates that have moved to the turntable 3 move through the pre-curing standing positions 32a through 32d, so that these substrates are allowed to stand for a fixed time, thus correcting the warping. Then, as a result of the rotation of the turntable 3, the substrates that have been allowed to stand are conveyed into the curing position 33, and are irradiated with ultraviolet light, so that the adhesive agent is cured. Furthermore, as a result of the rotation of the turntable 3, the substrates in which the adhesive agent has been cured, or a susceptor carrying these substrates, move to the transfer position 31, and are transferred to the substrate carrying part 2a that has arrived at the transfer position 24 of the turntable 2. Thus, in the process of movement from the transfer position 31 to the transfer position 24, the substrates in which the adhesive agent has been cured are allowed to stand for a fixed time so that the warping is corrected; then, these substrates reach the conveying position 25, and are conveyed out to the next process.

[Effects]

In the present embodiment constructed as described above, an effect similar to that of the first embodiment is obtained; furthermore, since two turntables 2 and 3 are used, a sufficient standing time can be ensured even though the turntables are small-diameter 6-position turntables. Furthermore, the transfer time of the substrates or susceptors carrying substrates between the turntables 2 and 3 can be used as the standing time; accordingly, a longer standing time can be obtained, and warping can be corrected.

Third Embodiment

[Construction]

Figure 8:
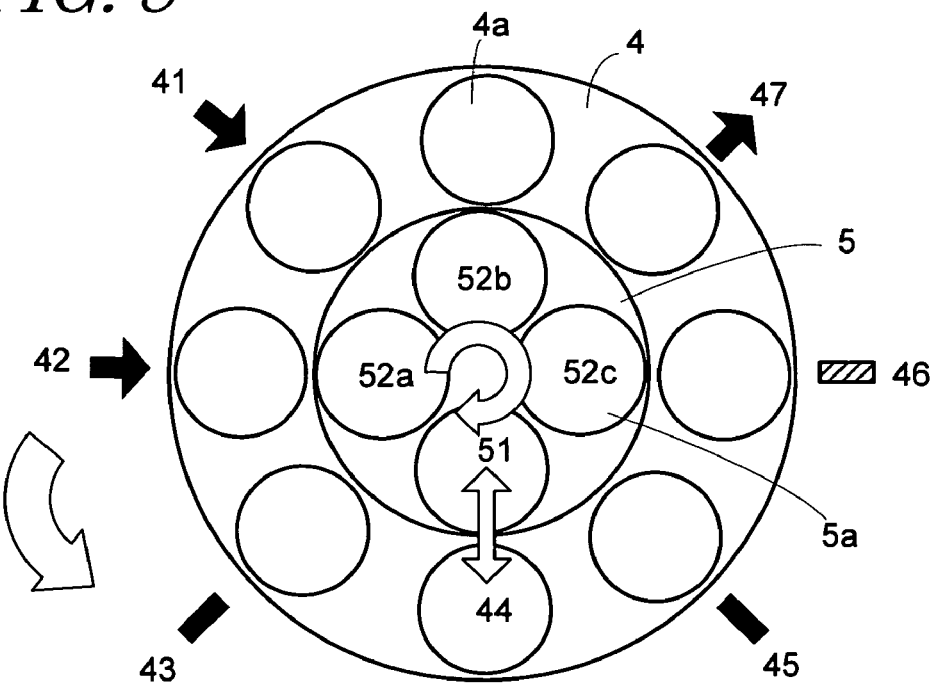
FIG. 8 is a schematic plan view showing a third embodiment of the present invention.

Next, a third embodiment of the present invention will be described. Specifically, as is shown in FIG. 8, the present embodiment is an embodiment using two concentric turntables 4 and 5 as conveying means for conveying substrates from the bonding part to the curing part. Of these, the large-diameter turntable 4 is an 8-position table which rotates while carrying substrates or susceptors that carry substrates; eight substrate carrying parts 4a are constructed along the circumference of this table. The small-diameter table 5 is a 4-position table which rotates in the opposite direction from the turntable 4 while carrying substrates or susceptors that carry substrates; four substrate carrying parts 5a are constructed along the circumference of this table.

The substrate carrying parts 4a in the turntable 4 are constructed so that these parts pass through substrate placement positions 41 and 42, a bonding position 43, a transfer position 44, a curing position 45, a post-curing standing position 46 and a conveying position 47 as the turntable 4 rotates. The substrate carrying parts 5a in the turntable 5 are constructed so that these parts pass through a transfer position 51 and pre-curing standing positions 52a through 52c as the turntable 5 rotates.

The substrate placement positions 41 and 42, bonding position 43, transfer position 44, curing position 45, post-curing standing position 46 and conveying position 47 in the turntable 4, and the transfer position 51 and pre-curing standing positions 52a through 52c in the turntable 5 are similar to those in the abovementioned first and second embodiments.

[Operation]

The operation of the present embodiment constructed as described above will be described next. Specifically, a pair of substrates coated with an adhesive agent are successively placed in the substrate carrying parts 4a that have arrived in the substrate placement position 41 and substrate placement position 42 as a result of the rotation of the turntable 4, and are bonded together in the bonding part in the bonding position 43. The bonded substrates or a susceptor carrying the substrates are conveyed out from the vacuum chamber into the atmosphere at room temperature by the rotation of the turntable 4, and move to the transfer position 44. These substrates are then transferred to the substrate carrying part 5a that has arrived at the transfer position 51 of the turntable 5.

The bonded substrates that have shifted to the turntable 5 move through the pre-curing standing positions 52a through 52c so that these substrates are allowed to stand for a fixed time, thus correcting the warping. As a result of the rotation of the turntable 5, the substrates that have been allowed to stand or susceptors carrying these substrates move to the transfer position 51, and are transferred to the substrate carrying part 4a that has arrived at the transfer position 44 of the turntable 4.

Then, as the turntable 4 rotates, the substrates that have been allowed to stand are conveyed into the curing position 45, and are irradiated with ultraviolet light, so that the adhesive agent is cured. Furthermore, the substrates in which the adhesive agent has been cured are allowed to stand for a fixed time in the post-curing standing position 46, so that the warping following curing is corrected; then, these substrates reach the conveying position 47, and are conveyed out to the next process.

[Effects]

In the present embodiment constructed as described above, an effect similar to that of the first embodiment is obtained; furthermore, as a result of the use of two concentric turntables 4 and 5 with different diameters, a sufficient standing time can be ensured even if the installation space used is that of an 8-position turntable. Accordingly, compared to a case in which a plurality of turntables are installed side by side, the space required can be reduced even further. Furthermore, the transfer time of the substrates between the turntables 4 and 5 can be used as the standing time.

Fourth Embodiment

[Construction]

Figure 9:
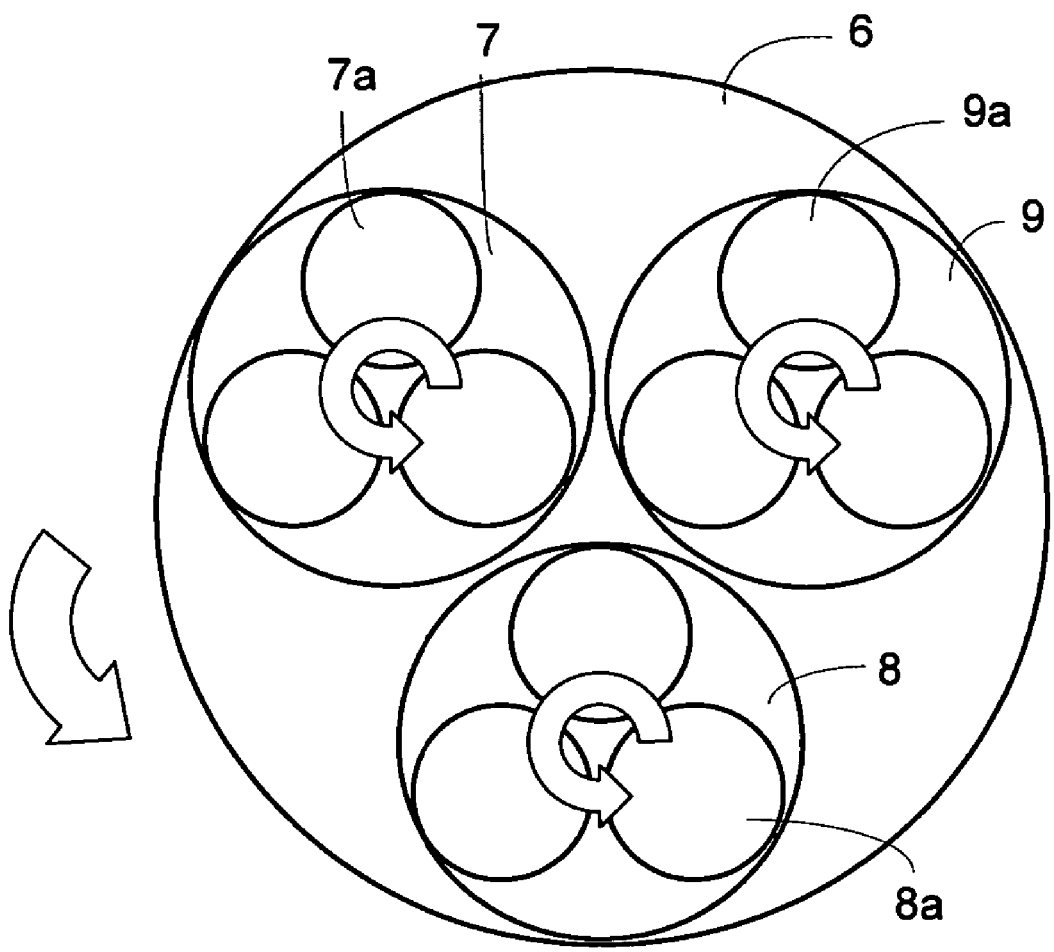
FIG. 9 is a schematic plan view showing a fourth embodiment of the present invention.

Next, a fourth embodiment of the present invention will be described. Specifically, as is shown in FIG. 9, the present embodiment is an embodiment which uses four turntables 6 and 7 through 9 with different axes as a conveying means for conveying substrates or susceptors carrying substrates from the bonding part to the curing part. The turntable 6 has a large diameter, and the turntables 7 through 9 have small diameters that inscribe the turntable 6. Furthermore, the small-diameter turntables 7 through 9 are 3-position tables that rotate while carrying substrates; three substrate carrying parts 7a through 9a are constructed along the circumference of each of these tables.

Furthermore, the abovementioned substrate carrying parts 7a through 9a are constructed as standing parts on which substrates transferred from the bonding part (not shown in the figures), or susceptors carrying such substrates, are carried, and the bonded substrates are allowed to stand until transferred to the curing part, by the rotation of the turntable 6 and turntables 7 through 9.

[Operation and Effects]

In the present embodiment constructed as described above, an effect similar to that of the first embodiment can be obtained; furthermore, since the bonded substrates or susceptors carrying such substrates are moved by being carried on a plurality of small-diameter turntables 7 through 9 installed on a large-diameter turntable 6, an additional standing time can be obtained compared to cases where the standing parts are formed as rectilinear conveying paths, or else a single turntable is used.

Fifth Embodiment

[Construction]

Figure 10:
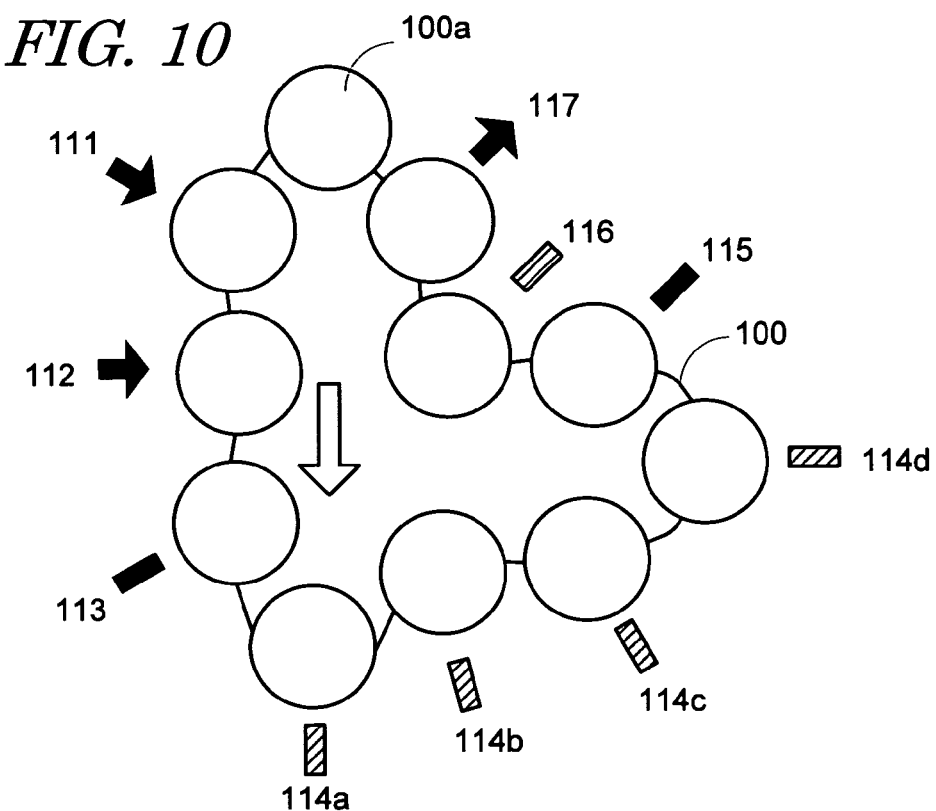
FIG. 10 is a schematic plan view showing a fifth embodiment of the present invention.

Next, a fifth embodiment of the present invention will be described. Specifically, as is shown in FIG. 10, the present embodiment is an embodiment in which a plurality of substrate carrying parts 100a are constructed on a curvilinear conveyor 100, so that substrates can be conveyed in an endless manner. This system is constructed so that the respective substrate carrying parts 100a pass through substrate placement positions 111 and 112, a bonding position 113, pre-curing standing positions 114a through 114d, a curing position 115, a post-curing standing position 116 and a conveying position 117 as a result of the operation of the conveyor 100.

[Operation and Effects]

In the present embodiment constructed as described above, substrate bonding, standing and adhesive agent curing are performed in the same manner as in the abovementioned first embodiment as a result of the movement of the substrate carrying parts 100a in accordance with the operation of the conveyor 100. Since the conveyor 100 causes the substrate carrying parts 100a to move in a curvilinear manner, the conveying time of the standing positions can be lengthened even if the installation area is small. Accordingly, warping can be corrected. Furthermore, since the degree of freedom of the conveying path layout is high, an appropriate layout can be designed in accordance with the apparatus used for other processes.

Sixth Embodiment

Figure 11:
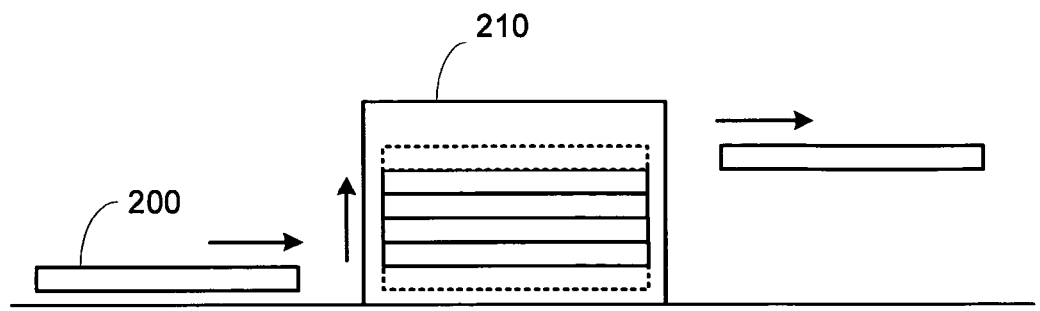
FIG. 11 is a schematic side view showing a sixth embodiment of the present invention.
Figure 12:
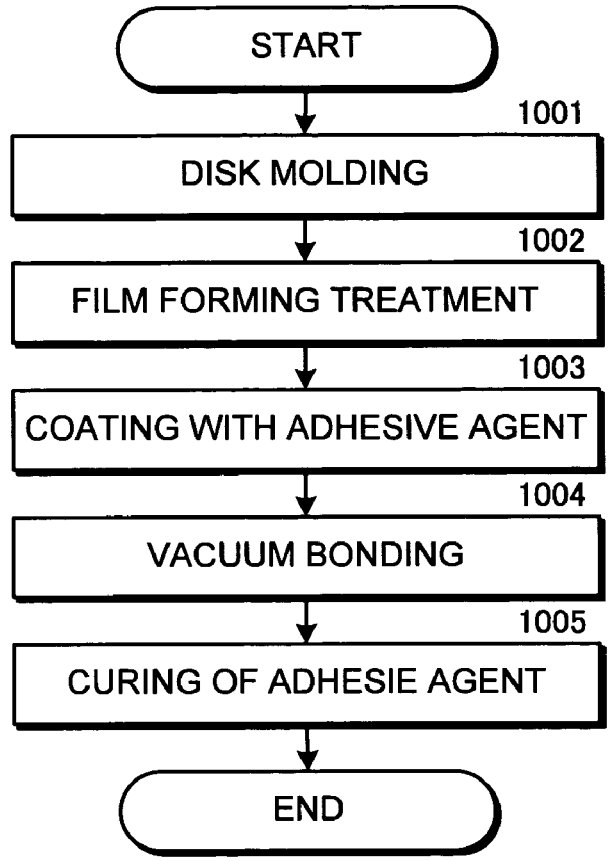
FIG. 12 is a flow chart showing a common disk manufacturing procedure.
Figure 13:
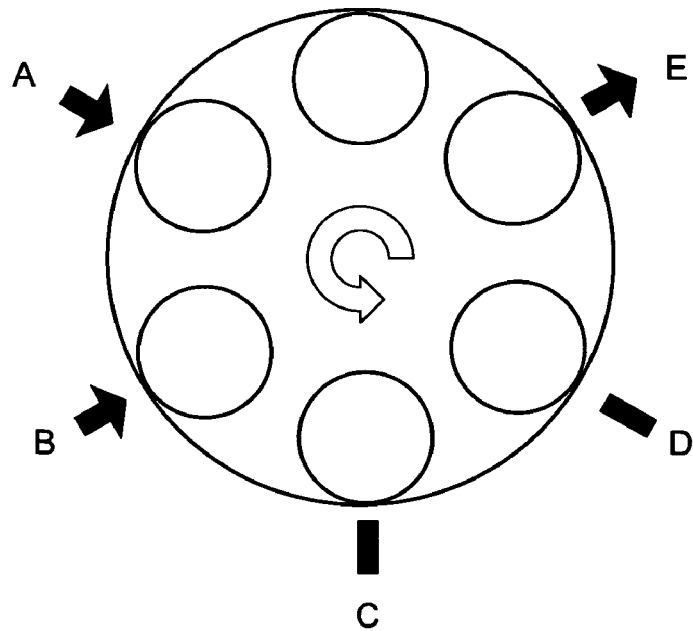
FIG. 13 is a schematic plan view showing a conventional example using a turntable as a conveying means in the case of substrate bonding.

Next, a sixth embodiment of the present invention will be described. Specifically, in this embodiment, as is shown in FIG. 11, susceptors 200 (carrying stands, receiving trays or cassettes may also be used) that can move while accommodating substrates, and an accommodating part 210 that stacks and accommodates these susceptors, are installed on the conveying path of the conveyor or the like from the substrate bonding part to the curing part. The susceptors 200 carry the substrates that have been bonded in the bonding part, and move toward the curing part in accordance with the operation of the conveyor.

Furthermore, the susceptors 200 are accommodated in the accommodating part 210 at an intermediate point during this movement, and are successively lifted upward by a raising-and-lowering mechanism not shown in the figures. Accordingly, the susceptors 200 inside the accommodating part 210 are successively stacked and lifted upward from below. The susceptor 200 that has reached the uppermost tier is discharged by a discharge mechanism not shown in the figures, and is conveyed to the curing part. Furthermore, the susceptors 200 release the substrates in the curing part, and the substrates are conveyed to the curing part.

In the present embodiment constructed as described above, as a result of the susceptors 200 being stacked, the standing time of the bonded substrates can be lengthened while reducing the installation area compared to cases in which the substrates are simply conveyed in a rectilinear manner; accordingly, warping can be corrected.

Other Embodiments

The present invention is not limited to the abovementioned embodiments. For example, the number of positions used to ensure a sufficient standing time before curing and after curing is not limited to the methods indicated in the abovementioned embodiments. Accordingly, the number of standing positions of the turntables, the corresponding turntable diameters, the conveying distance of the conveyor and the like can be appropriately altered in the design stage. Furthermore, any of the positions in the abovementioned fourth embodiment may be used as the bonding position or curing position.

Furthermore, in regard to the apparatus used to shift substrates between the bonding part, curing part and turntables, any universally known technique may be applied. For example, arms that transfer substrates between the turntables by suction chucking or mechanical gripping, inverting transfer devices that are used to invert the substrates and transfer the substrates to the bonding part or the like may be appropriately combined and used. Furthermore, the size, shape, material number of recording layers and the like of the disk that is the object of manufacture in the present invention may be freely selected. The type of adhesive agent that is used may also be freely selected. In particular, the type of adhesive agent used would appear to have a great effect on the standing time. However, in addition to commonly used adhesive agents such as hot melt adhesives, tacky sheets, UV curable adhesive agents and the like, any type of adhesive agent either currently usable or usable in the future may also be used. The optimal standing time also varies in accordance with this adhesive agent type.

INDUSTRIAL APPLICABILITY

The present invention makes it possible to manufacture flat-plate-form recording media that are free of warping by means of a simple and compact apparatus.

The invention claimed is:

1. A compact bonding apparatus for flat-plate forms of recording media formed by a pair of substrates bonded together, comprising:
    a turntable for revolving about an axis having a plurality of substrate carrying parts on and adjacent a perimeter of the turntable, a rotational speed of the turntable is set to enable correction of any warping of the recording media;
    a plurality of operational units are positioned sequentially along the turntable perimeter to interact with the substrate carrying parts on the turntable in the following sequence,
        a first substrate placement unit for placing a first substrate on one of the plurality of substrate carrying parts,
        a second substrate placement unit for placing a second substrate on top of the first substrate with adhesive therebetween on the one of the plurality of substrate carrying parts,
        a bonding unit for receiving the first and second substrates with adhesive to apply a vacuum to adhere the first and second substrates together as bonded substrates on the one of the plurality of substrate carrying parts,
        a pre-curing standing unit portion of the turntable that occupies one third of the plurality of the substrate carrying parts on the turntable, each holding a free standing bonded substrates that are only being subject to ambient atmosphere and temperature to enable a predetermined rest time period of rotation of the turntable to relieve stress between the bonded substrates and prevent warping of the bonded substrates, before a subsequent operational process is performed on the bonded materials, and
        a curing unit to irradiate the bonded substrates with ultraviolet light to cure the adhesive between the stress relieved bonded substrates; and
        means for setting a rotational speed of the turntable to enable correction of warping in respectively a radial and a tangential direction of the free standing bonded substrates as the turntable rotates through the pre-curing standing unit portion of the turntable.

2. The compact bonding apparatus according to claim 1 further including the following operational units of
    a post curing unit to relieve any post curing hear warping of the cured bonded substrates resulting from the curing in an ambient atmosphere and temperature for a second predetermind time period, and
    an exit unit for removal of the finished recording media.

3. The compact bonding apparatus according to claim 2 wherein the bonded substrates remain free standing on the plurality of substrate carrying parts on the turntable from the bonding unit through the post-curing unit.

4. The compact bonding apparatus according to claim 1 wherein the predetermined rest time period is in a range of 7 to 15 seconds.

5. The compact bonding apparatus according to claim 1 wherein the plurality of substrate carrying parts are one of a susceptor and a surface of the turntable.

6. The compact bonding apparatus according to claim 1 further including an accommodating part and a plurality of susceptors that can be stored in the accommodating part, the accommodating part can be transported by the turntable between the bonding unit and the curing unit and the susceptor can support bonded substrates in a free standing manner on the turntable.

7. A bonding apparatus comprising a bonding part which bonds together a plurality of substrates coated with an adhesive agent, and a curing part which cures the adhesive agent of the substrates that have been bonded together, characterized in that
    the bonding apparatus has conveying means which
    (1) conveys the substrates coated with an adhesive agent to the bonding part;
    (2) conveys the substrates from a vacuum vessel into an atmosphere at room temperature after the substrates are bonded in the vacuum vessel of the bonding part while being vacuumed,
    (3) conveys the substrates to the curing part,
    the conveying means has a conveying section which is located between the vacuum vessel and the curing part, for conveying simultaneously a plurality of the bonded substrates being in contact with only the surface of the conveying means,
    the conveying section eliminates internal stress from the bonded substrates by permitting the plurality of bonded substrates to be free standing on the conveying means in the atmospheric pressure at room temperature for a predetermined rest time period to relieve stress between the plurality of bonded substrates and prevent warping of the bonded substrates;

means for setting a transit speed of the conveying means to enable correction of warping in respectively a radial and a tangential direction of the free standing bonded substrates as the conveying means conveys the bonded substrates through the conveying section to the curing part;

a curing unit to irradiate the bonded substrates with ultraviolet light to cure the adhesive between the stress relieved bonded substrates, a post-curing unit to relieve any post curing heat warping of the cured bonded substrates resulting from the curing in an ambient atmosphere and temperature for a second predetermined time period, and an exit unit for removal of the finished recording media.

8. The bonding apparatus according to claim 7, characterized in that the conveying means is a turntable which rotates while carrying a plurality of substrates.

9. The bonding apparatus according to claim 8, characterized in that a plurality of the turntables are provided.

10. The bonding apparatus according to claim 9, characterized in that the plurality of turntables include concentric small-diameter and large-diameter tables.

11. The bonding apparatus according to claim 7, characterized in that the conveying means has an accommodating part which stacks and accommodates a plurality of substrates that are conveyed from the bonding part while conveying the substrates to the curing part.

12. A bonding apparatus comprising a bonding part which bonds together a pair of substrates coated with an adhesive agent, and a curing part which cures the adhesive agent of the substrates that have been bonded together, characterized in that the bonding part has a vacuum vessel in which the pair of substrates are bonded while being vacuumed, the conveying means has a conveying section which is located between the vacuum vessel and the curing part, conveys simultaneously a plurality of susceptors carrying the bonded substrates being contacted with only the surface of the susceptors and the conveying section eliminates internal stress from the bonded substrates with atmospheric pressure at room temperature, and means for setting a transit speed of the conveying means to enable correction of warping in respectively a radial and a tangential direction of a free standing bonded substrate as the conveying means conveys the bonded substrates through the conveying action to the curing part.

13. The bonding apparatus according to claim 12 wherein the transit speed of the conveying means provides a time period within a range of 7 to 15 seconds through the conveying section from the bonded part to the curing part.

14. A compact bonding apparatus for flat-plate forms of recording media formed by a pair of substrates bonded together, comprising:

a first turntable for revolving about an axis having a plurality of substrate carrying parts on and adjacent a perimeter of the turntable;

a plurality of operational units are positioned sequentially along the turntable perimeter to interact with the substrate carrying parts on the turntable in the following sequence, a first substrate placement unit for placing a first substrate on one of the plurality of substrate carrying parts, a second substrate placement unit for placing a second substrate on top of the first substrate with adhesive therebetween on the one of the plurality of substrate carrying parts, a bonding unit for receiving the first and second substrates with adhesive to apply a vacuum to adhere the first and second substrates together as bonded substrates on the one of the plurality of substrate carrying parts, a curing unit to irradiate the bonded substrates with ultraviolet light to cure the adhesive between the stress relieved bonded substrates, a post-curing unit to relieve any post curing heat warping of the cured bonded substrates resulting from the curing in an ambient atmosphere and temperature for a second predetermined time period, and an exit unit for removal of the finished recording media; and a second turntable having a plurality of substrate carrying parts, on and adjacent a perimeter of the second turntable, for receiving bonded substrates from the first turntable after the bonding unit and after one revolution of the second turntable to return each of the plurality of substrate parts to the first turntable before the curing unit, wherein each of the plurality of bonded substrates are held respectively in a free standing manner in a respective substrate carrying part while only being subject to ambient atmosphere and temperature to enable a predetermined rest time period during rotation on the second turntable to relieve stress between the bonded substrates and prevent warping of the bonded substrates, before a subsequent operational process is performed on the bonded materials.

15. A compact bonding apparatus according to claim 14 wherein the predetermined rest time period is in a range of 7 to 15 seconds.

16. A compact bonding apparatus according to claim 14 wherein the second turntable is concentrically mounted within the first turntable.

17. A compact bonding apparatus according to claim 14 wherein the second turntable is rotated adjacent the first turntable and the first and second turntable consist of the only means for conveying the plurality of the substrate for each operational unit in forming the recording media.

18. A compact bonding apparatus for flat-plate forms of recording media formed by a pair of substrates bonded together, comprising:

a first turntable for revolving about an axis having a plurality of substrate carrying parts on and adjacent a perimeter of the turntable;

a plurality of operational units are positioned sequentially along the turntable perimeter to interact with the substrate carrying parts on the turntable in the following sequence, a first substrate placement unit for placing a first substrate on one of the plurality of substrate carrying parts, a second substrate placement unit for placing a second substrate on top of the first substrate with adhesive therebetween on the one of the plurality of substrate carrying parts, a bonding unit for receiving the first and second substrates with adhesive to apply a vacuum to adhere the first and second substrates together as bonded substrates on the one of the plurality of substrate carrying parts, a curing unit to irradiate the bonded substrates with ultraviolet light to cure the adhesive between the stress relieved bonded substrates, a post-curing unit to relieve any post curing heat warping of the cured bonded substrates resulting from the curing in an ambient atmosphere and temperature for a second predetermined time period, and an exit unit for removal of the finished recording media;

a second turntable having a plurality of substrate carrying parts, on and adjacent a perimeter of the second turntable, for receiving bonded substrates from the first turntable after the bonding unit and after one revolution of the second turntable to return each of the plurality of substrate parts to the first turntable before the curing unit, wherein each of the plurality of bonded substrates are held respectively in a free standing manner in a respective substrate carrying part while only being subject to ambient atmosphere and temperature to enable a predetermined rest time period during rotation on the second turntable to relieve stress between the bonded substrates and prevent warping of the bonded substrates, before a subsequent operational process is performed on the bonded materials; and means for setting a rotational speed of the second turntable to enable correction of warping in respectively a radial and a tangential direction of the bonded substrates as the second turntable rotates through the pre-curing free standing period of the second turntable in a time period within a range of 7 to 15 seconds to also allow release of bubbles in the bonded substrates.

19. A compact bonding apparatus according to claim 18 wherein the second turntable is concentrically mounted within the first turntable.

20. A compact bonding apparatus according to claim 18 wherein the second turntable is rotated adjacent the first turntable and the first and second turntable consist of the only means for conveying the plurality of the substrate for each operational unit in forming the recording media.

* * * * *